Sept. 16, 1930.  S. SCALPELLI  1,776,165
BUMPER
Filed Aug. 19, 1929

Sylvester Scalpelli,
INVENTOR
BY Victor J. Evans
ATTORNEY

WITNESS:

Patented Sept. 16, 1930

1,776,165

UNITED STATES PATENT OFFICE

SYLVESTER SCALPELLI, OF JOLIET, ILLINOIS, ASSIGNOR TO THE COIL SPRING BUMPER COMPANY, OF JOLIET, ILLINOIS

BUMPER

Application filed August 19, 1929. Serial No. 386,910.

My present invention has reference to a bumper for automobiles, and my primary object is the provision of a bumper for this purpose which shall be of greater resiliency or yieldability than bumpers of the ordinary type so that the same, when contacting with an obstruction will inflict no serious injury thereto nor will injury be inflicted to the bumper.

To the attainment of the foregoing the invention consists in the improvement hereinafter described and definitely claimed.

Figure 1:
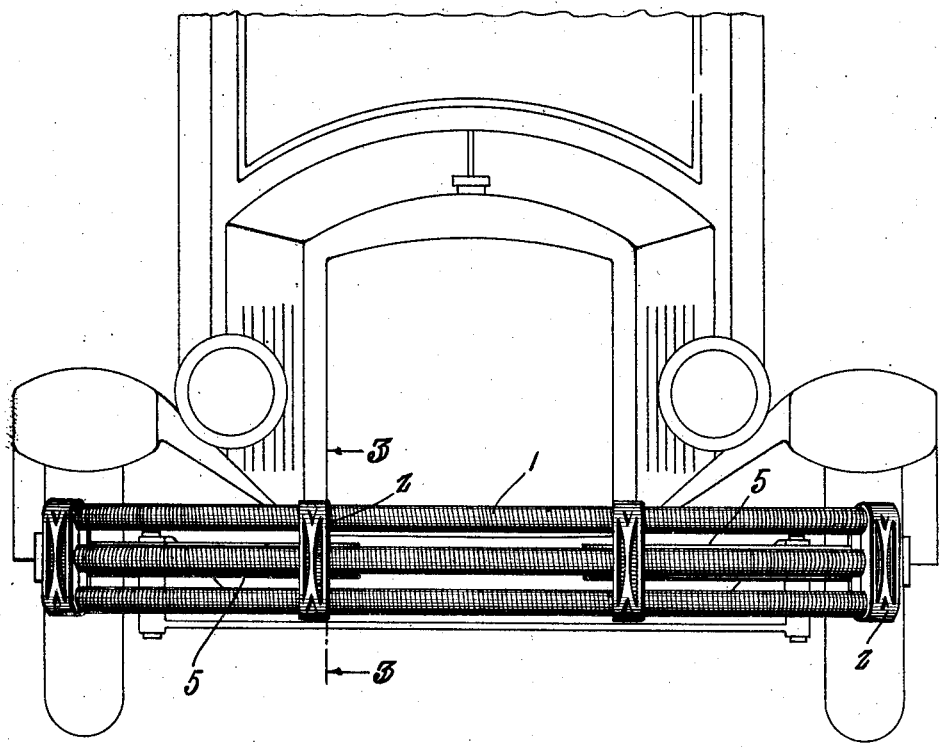
Figure 1 is a front elevation of an automobile equipped with a bumper in accordance with this invention.
Figure 2:
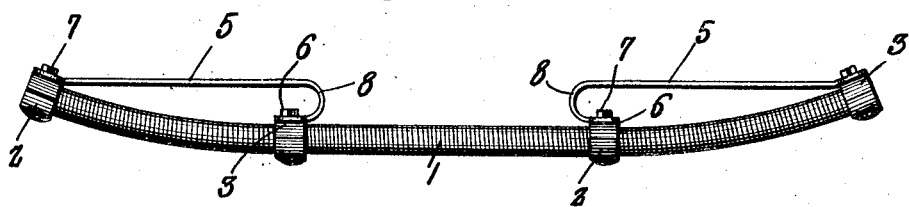
Figure 2 is a top plan view of the bumper.
Figure 3:
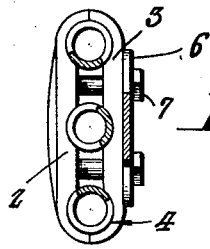
Figure 3 is a sectional view on the line 3—3 of Figure 1.

As disclosed by the drawings the bumper bars 1 are each of the same length and are each formed of closely wound coiled springs. In the showing of the drawings three bars are employed, and these bars are connected together and held in proper spaced relation by clips. All of the clips are of a similar construction and, therefore, a detailed description of one will be taken as equally applicable to the other. The clips are arranged on the ends of the bumper bars 1 and at points suitably spaced from said ends. Each clip comprises an outer plate 2 and an inner plate 3. The confronting faces of the clips are formed with rounded depressions 4 in which the bumper bars 1 are received and secured. The outer clips and the clips adjacent thereto are connected together by flat springs 5. Each of the springs has one end formed with a widened or laterally extending portion 6 and through these portions 6 there are passed bolts 7 that are received through non-threaded openings in the inner plates 3 of the clips and are likewise received in threaded openings in the outer plates 2 of the clips. The ends of the flat springs which are connected to the outer clips are disposed at a determined angle with respect to the springs 5 and the opposite or inner end of each of the springs is rebent upon itself, as at 8, and on the straight terminals of the said rebent portions the inner widened parts 6 are formed.

Obviously by adjusting the inner clips with respect to the outer clips the ends of the bumper bars may be arched or curved to determined degrees and the flat springs 5 are connected directly to the front of the automobile in the usual manner.

From the foregoing it will be noted that I have provided an ornamental bumper construction which embodies a greater amount of resiliency than those of the ordinary type of such devices. The bumper bars being constructed of coil springs will materially yield when brought against an obstacle and likewise the springs 5 will also yield or give under such contact. The result is that a person or obstacle contacted by the bumper bars will not be seriously injured nor can serious injury be imparted to the bumper. Naturally when relieved of the force of contact the bumper will assume its natural position and in this respect it may be well to state that the bumper has a tendency to force an object contacting therewith away from such bumper.

Obviously I do not wish to be restricted to the precise details herein set forth and, therefore, hold myself entitled to make such changes therefrom as fairly fall within the scope of what I claim.

In case of collision the bumper will greatly lessen the shock to the people in the vehicle.

Having described the invention, I claim:

A bumper for automobiles or like vehicles, comprising a plurality of closely wound coiled springs each of the same length, inner and end pairs of clips connecting the bars, each of said clips comprising an inner and an outer plate, the confronting faces of the plates having rounded depressions to receive the bars therein, flat springs having their outer ends widened for the reception of bolts which are passed through the inner plates and are screwed in the outer plates of the clips, each of said plates having its inner end rebent and terminating in a flat portion which is widened and through which widened portion there are passed bolts that are received through openings in the inner plates of the inner clips and are threaded in the outer plates of the said inner clips.

In testimony whereof I affix my signature.

SYLVESTER SCALPELLI.